(12) United States Patent
Tadic-Galeb et al.

(10) Patent No.: US 7,035,017 B2
(45) Date of Patent: Apr. 25, 2006

(54) SYSTEM AND METHOD FOR TELECENTRIC PROJECTION LENSES

(75) Inventors: Biljana Tadic-Galeb, Thousand Oaks, CA (US); Robert E. Fischer, Westlake Village, CA (US); Larry D. Owen, Phoenix, AZ (US)

(73) Assignee: Quantum Vision, Inc., Sunnyvale, CA (US)

( * ) Notice: Subject to any disclaimer, the term of this patent is extended or adjusted under 35 U.S.C. 154(b) by 0 days.

(21) Appl. No.: 10/826,587

(22) Filed: Apr. 16, 2004

(65) Prior Publication Data

US 2004/0233540 A1  Nov. 25, 2004

Related U.S. Application Data

(60) Provisional application No. 60/518,254, filed on Nov. 7, 2003, provisional application No. 60/518,108, filed on Nov. 7, 2003, provisional application No. 60/463,949, filed on Apr. 18, 2003.

(51) Int. Cl.
  *G02B 13/22* (2006.01)
(52) U.S. Cl. .................................................... 359/663
(58) Field of Classification Search ................ 359/663, 359/649–651, 708, 713–718
  See application file for complete search history.

(56) References Cited

U.S. PATENT DOCUMENTS

| | | | | |
|---|---|---|---|---|
| 5,200,861 A | * | 4/1993 | Moskovich | 359/662 |
| 5,804,919 A | * | 9/1998 | Jacobsen et al. | 313/506 |
| 6,747,710 B1 | * | 6/2004 | Hall et al. | 349/9 |
| 6,791,629 B1 | * | 9/2004 | Moskovich et al. | 348/779 |
| 2004/0090600 A1 | * | 5/2004 | Blei et al. | 353/31 |

FOREIGN PATENT DOCUMENTS

WO  WO 2080577 A1 * 10/2002

* cited by examiner

*Primary Examiner*—Scott J. Sugarman
(74) *Attorney, Agent, or Firm*—Fliesler Meyer LLP (57) ABSTRACT

A projection lens system which includes a telecentric lens assembly. The lens may be used to form an image from a light source, including for example a resonant microcavity phosphorcathode ray tube, onto a screen or display, such as in a television or a projection device. In accordance with one embodiment, a planar cooling gap or cavity (which may or may not contain a cooling liquid) is included between the imaging surface and the matching planar surface of the field lens. The use of a planar gap alleviates any temperature differentials across the cooling liquid and the lens surfaces, as compared with alternate designs that may have a non-planar gap between the faceplate and the field lens, or that use liquid lenses.

22 Claims, 4 Drawing Sheets

SYSTEM AND METHOD FOR TELECENTRIC PROJECTION LENSES

CLAIM OF PRIORITY

The present application claims priority to provisional applications "SYSTEMS AND METHODS FOR WELL-CORRECTED TELECENTRIC PROJECTION LENSES", Ser. No. 60/463,949, filed Apr. 18, 2003 by Biljana Tadic-Galeb, et al.,; "TELECENTRIC LENS ASSEMBLY", Ser. No. 60/518,254, filed Nov. 7, 2003 by Biljana Tadic-Galeb, et al.,; and "TELECENTRIC LENS ASSEMBLY", Ser. No. 60/518,108, filed Nov. 7, 2003 by Biljana Tadic-Galeb, et al.,; each of which applications are incorporated herein by reference.

RELATED PATENTS

The present application is also related to U.S. Pat. No. 5,469,018, "RESONANT MICROCAVITY DISPLAY", issued Nov. 21, 1995 by Stuart J. Jacobsen, et al.,; and U.S. Pat. No. 5,804,919, "RESONANT MICROCAVITY DISPLAY", issued Sep. 8, 1998 by Stuart J. Jacobsen, et al., both of which are incorporated herein by reference.

FIELD OF THE INVENTION

The present invention relates generally to high performance projection lenses, such as may be used with large screen TV, projection devices, or other imaging systems and applications; and particularly to a telecentric lens assembly for use with such systems.

BACKGROUND

Existing projection television systems project an image from an electronic display device onto a large screen in a manner analogous to how a 35 mm slide projector projects a small slide onto a large screen. Display devices that are typically used in large screen TV and/or HDTV applications include a high brightness cathode ray tube (CRT), a Texas Instruments Digital Light Processor chip (DLP), a Liquid Crystal on Silicon chip (LCOS), or some other form of electronic display device. The display device can be reflective, transmissive, or self-emissive.

A key property of a CRT form of display device is that the image to be projected is "Lambertian." When an image is Lambertian, the observed brightness of that image is independent of the viewing angle of the observer. For example, an image viewed on a CRT by a person should look equally bright from any angle, as on a computer monitor or a CRT-based TV set. The light is emitted uniformly into a hemisphere over 2 pi steradians, where a steradian is a unit of measure equal to the solid angle subtended at the center of a sphere by an area on the surface of the sphere that is equal to the radius squared, such that the total solid angle of a sphere is 4 pi steradians. In order to capture and project as much of the light as possible, projection lenses for CRT-based projection systems must collect as large a solid angle as possible from the CRT. In other words, the lenses must be of a "high numerical aperture," or correspondingly of a "low f/number," where f/number (also known as f-number and f:number) is a measure of relative aperture of a lens, typically the ratio of focal length to the diameter of the exit pupil of the lens.

Since a CRT is Lambertian in light output, the solid angle or cone of light needs only to be sufficiently large for the desired screen brightness. The cone of light can be tilted or rotated with respect to the lens and CRT centerline.

A new class of CRT display devices uses Resonant Microcavity Phosphor (RMP) technology in order to direct most of the light emitted into a relatively small solid angle, or cone, normal to the surface of the CRT, as opposed to the Lambertian nature of traditional CRTs discussed above. Thus, instead of the light being emitted from the CRT phosphor in a Lambertian manner into 2 pi steradians (a full hemisphere) as with a conventional CRT, the light is emitted into a much smaller light cone with a centerline normal to the CRT surface. The net result of this is that brighter images with a better contrast will result on the screen.

There are several problems with current CRT projection lens technology. For example, existing CRT projection designs often use Fresnel lenses or "Liquid" lenses to redirect the light into the entrance pupil of the projection lens. The "liquid" lens is formed using a liquid contained between the external surface of the CRT faceplate and an optical element or "dome" in the lens design, for the redirecting element. This is often called a "C-element". These lens approaches cause undesirable scattering, thermal sensitivity and stray light problems. An additional problem, in many projection lenses, is the complexity of the design that leads to high cost, temperature and/or tolerance sensitivity. Further, many projection lenses are designed for an internally curved CRT phosphor surface.

SUMMARY

The invention provides a projection lens system which includes a telecentric lens. The lens may be used to form an image from a light source, including for example an RMP or CRT, onto a screen or display, such as in a television or a projection device. In accordance with one embodiment, a planar cooling gap or cavity (which may or may not contain a cooling liquid) is included between the imaging surface (i.e. the surface of the RMP or CRT) and the matching planar surface of the field lens. The use of a planar gap alleviates any temperature differentials across the cooling liquid and the lens surfaces, as compared with alternate designs that may have a non-planar gap between the faceplate and the field lens, or that use "liquid" lenses.

DETAILED DESCRIPTION

Figure 1:
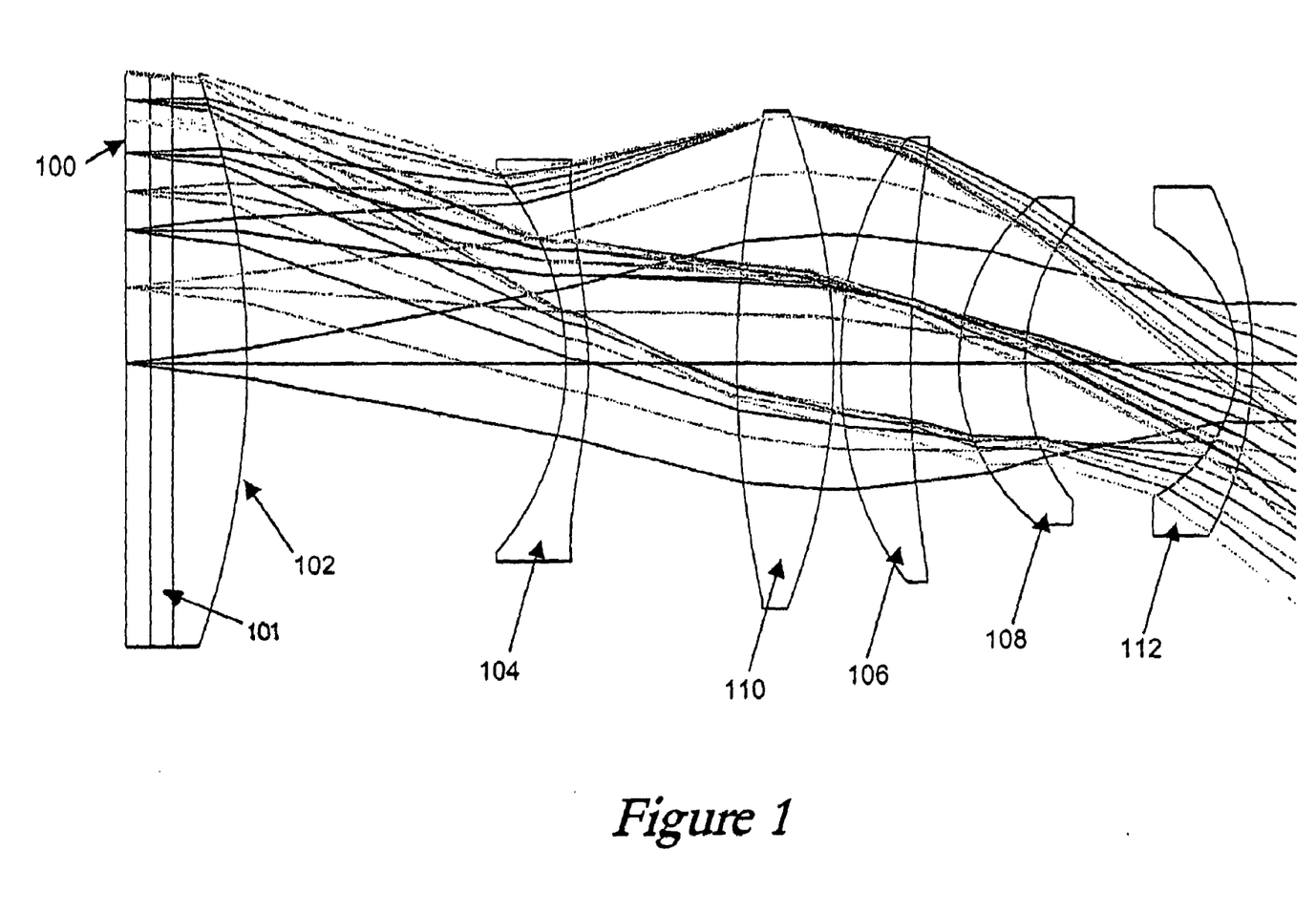
FIG. 1 shows an illustration of a telecentric lens assembly in accordance with an embodiment of the invention.

FIG. 1 shows an illustration of a telecentric lens assembly in accordance with an embodiment of the invention. In particular, FIG. 1 shows an example of a multi-element projection lens, or lens system, that can be used, for example, with a CRT for a particular display color, such as a "green" channel. As shown in FIG. 1, a CRT or RMP faceplate 100 is used as the display device, whereby light is emitted normal to the surface of the faceplate. A plano-convex spherical field lens 102 can take the telecentric light from the CRT and redirect the light toward the entrance pupil of the projection lens. Existing CRT projection lenses do not utilize telecentric light from the CRT surface, such that the cones of light collected by the lens are not emitted normal to the CRT surface. A spherical lens is also superior to a Fresnel lens for suppressing stray light and scattering.

In accordance with one embodiment, a planar gap or cavity 101 (which may or may not contain a cooling liquid) is included between the flat CRT surface 100 and the matching planar surface of the field lens 102. The use of a planar cavity alleviates any temperature differentials across the cooling liquid and the lens surfaces, as compared with alternate designs that may have a non-planar gap between the faceplate and the field lens, or that use "liquid" lenses. A cooling liquid can optionally be used within the cavity. Together, the CRT/RMP faceplate and the field lens operate as a group to create the initial telecentric image.

In accordance with one embodiment a focusing group portion of the projection lens comprises three plastic elements 104, 106, and 108 and two glass elements 110 and 112. Each lens element can have a coating, such as an anti-reflection coating, on at least one surface of the lens. A combination of glass and plastic elements can be used, as glass elements are typically used for power while plastic elements are typically used for higher order correction via aspheric surfaces and production economies. The selection of elements can be influenced by the desire to minimize the number and size of elements within the constraints of the applicable performance requirements. Designs can be chosen that utilize all glass or all plastic elements, for example, but could result in a more complex and expensive lens system requiring additional elements. The exemplary design of FIG. 1 can be advantageous in certain embodiments, as such a design can be optimized for a three color system, without special color filters and with nearly identical prescriptions.

In accordance with one embodiment, the first plastic element 104 can be negatively powered, in order to simultaneously correct the residual field curvature and the distortion. This element 104 can be placed approximately ⅔ of the way from the field lens to a positively powered grouping of elements. Elements 110, 106 and 108, respectively, take the diverging light from element 104 and create converging beams, forming a reversed uncorrected image approximately the same size as the object. In this example, the object is the image generated in the resonant microcavity phosphor (RMP) source, on the inside of the CRT faceplate. Each plastic lens 104, 106, and 108 can have one aspheric surface, helping to correct aberrations coming from the powerful glass spherical lenses 110 and 112. A single aspheric surface can be easier, and cheaper, to manufacture than an element with two aspheric surfaces. A plastic element without aspheric surfaces can be used, reducing the overall lens assembly costs, if there is no need for aspheric correction.

Final element 112 has a negative power, and can locate the "final" image at a desired throw distance with a desired field of view, which in some embodiments can be approximately 90 degrees. Element 112 can help to magnify the image, such as a magnification in the range of approximately 8 times to approximately 15 times, or more, of the size of the original image projected by the faceplate 100. While in this design element 112 is the final element, there may be elements such as mirrors between element 112 and the final screen image. There may also be optical components in the screen itself, such as Fresnel or lenticular elements. Such screen components can be used to redirect the light through the screen and toward the desired viewing position(s). Two meniscus elements, one plastic 108 and one glass 112, can be close to concentric about the lens aperture stop such that the elements 108 and 112 can effectively cancel their own aberrations.

Figure 2:
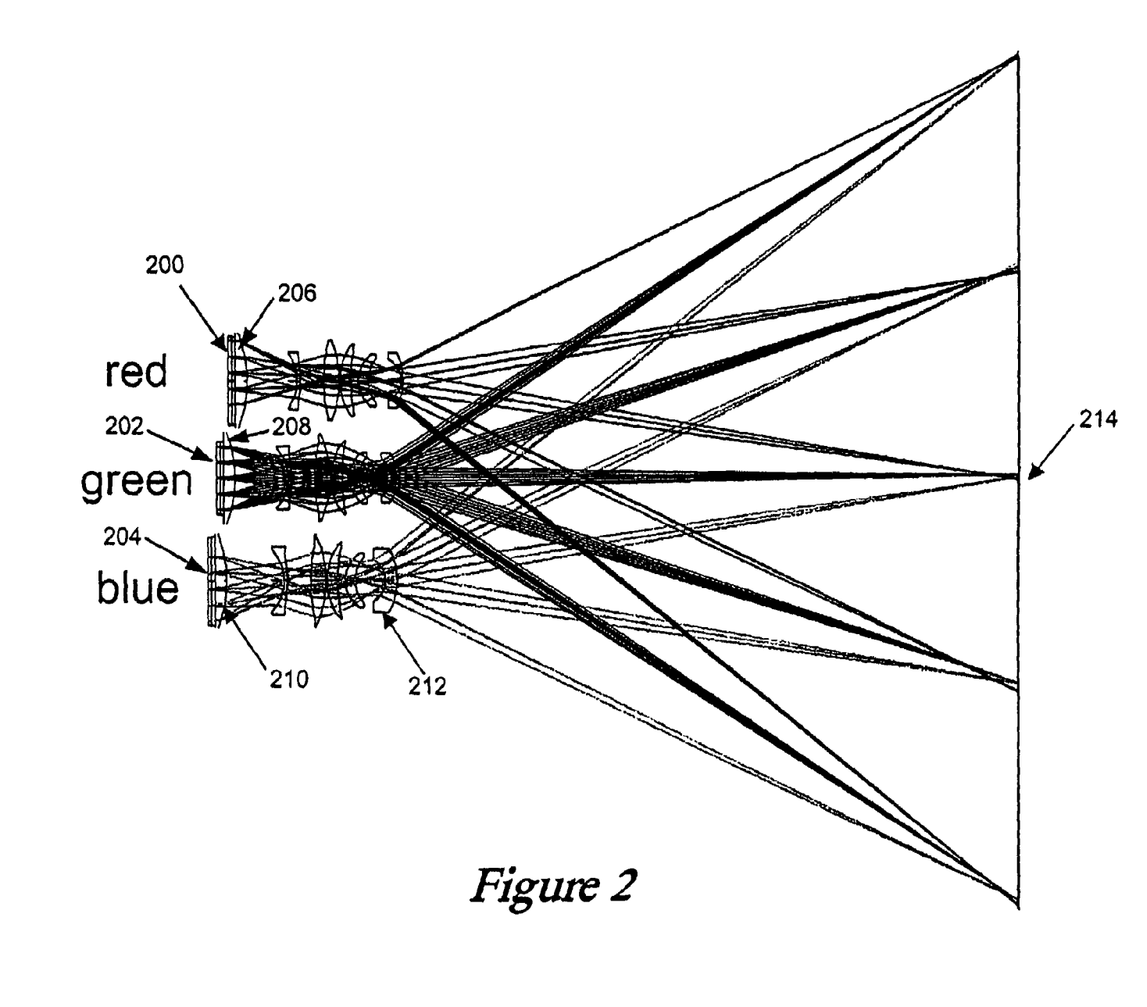
FIG. 2 shows an illustration of an RGB telecentric lens assembly in accordance with an embodiment of the invention.

CRT-based projection systems typically use three CRTs, one CRT for red light, one for green light, and one for blue light, each with a set of lenses. FIG. 2 shows the embodiment of FIG. 1 used in such a three-CRT system. As shown in FIG. 2, there is a CRT 200, 202, 204 and corresponding lens system 206, 208, 210 for each of the red, green, and blue colors, respectively, to be projected onto a screen 214. In one embodiment, all three lens systems are parallel to one another rather than tilted. A lens system can have a central axis running through all lenses in the lens system, and lens systems can be said to be parallel when the respective central axes are parallel. The parallelism of the lens systems can be accomplished in one embodiment by laterally displacing each adjacent CRT with respect to any adjacent CRT. The lateral displacement can be an a distance that is approximately equal to the lens separation, divided by the lens magnification, such that the image projected from each CRT/lens system overlaps the image projected from any other CRT/lens system, as shown in FIG. 2. The lateral displacement of parallel projection elements in order to ensure image overlap will be referred to herein as "anti-keystoning." CRT projection systems can tilt the lens systems so as to overlap the images on the screen, but this has the disadvantage of requiring the CRTs to also be tilted so as to meet the so-called "Scheimpflug Condition." An advantage to meeting the Scheimpflug condition is that all points are brought into focus on the image planes, with a reduction of the requirement for depth of focus. The Scheimpflug condition entails a minor disadvantage, however, in that it typically introduces some distortion.

Figure 3:
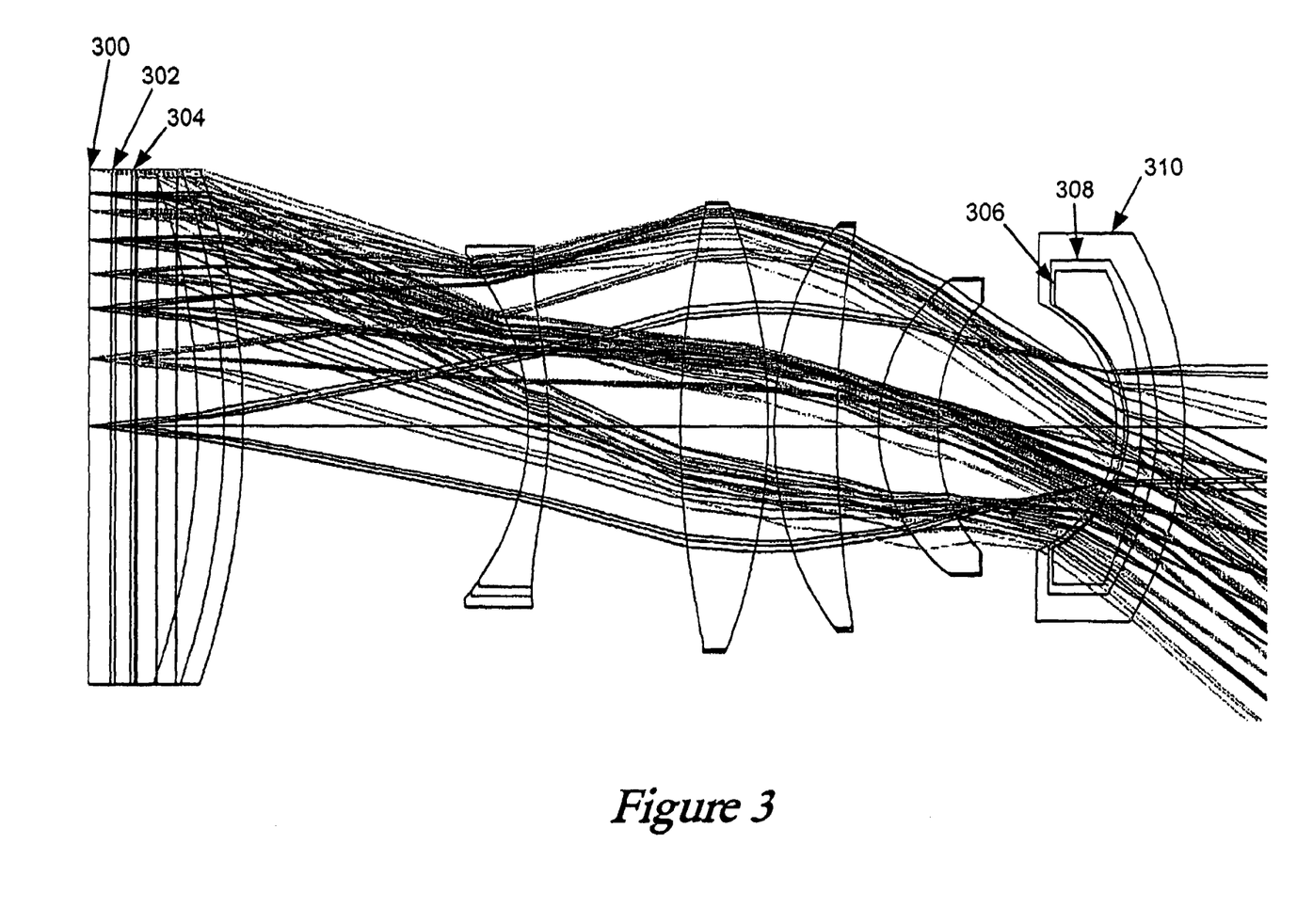
FIG. 3 shows an illustration of an RGB telecentric lens assembly in accordance with an embodiment of the invention, with three channels overlapped for comparison.

In order to provide desired performance in each of the red, green, and blue wavelength bands, the three lens systems described with respect to FIG. 2 can each have different front elements and different CRT focus positions. For example, FIG. 3 shows the lens systems for red, green, and blue being overlapped. The unique position of the each of the three CRTs 300, 302, 304 is shown, as is position and shape of the three unique front elements 306, 308, 310. Otherwise, each of the lens systems can be substantially identical. One unique aspect of such a lens system design is that only one element differs for each color, which allows for excellent optical performance while at the same time allowing for low cost due to most of the lenses being identical.

Another advantage to such a system is that a lens system can be optimized with material properties set at the elevated temperature expected in use. This can account for a thermally-induced focus shift that is often encountered when using plastic lens elements.

Example Design Characteristics

The following section describes the desired characteristics for an example of a finite conjugate, fixed focal length projection lens, specifically designed for projection of the image from a Resonant Microcavity Phosphor cathode ray tube (RMP-CRT) to a projection screen. This example is provided for the purposes of illustration and description. It is not intended to be exhaustive or to limit the invention to the precise forms disclosed. Many modifications and variations will be apparent to one of ordinary skill in the art. The embodiments described below are given in order to best explain the principles of the invention and its practical application, thereby enabling others skilled in the art to understand the invention for various embodiments, and with various modifications that are suited to the particular use contemplated. Particularly, it will be evident that minor modifications may be made to the arrangements, dimensions, and compositional materials of the lens elements, and that one or more lens elements within a functional group may be replaced with a different number, arrangement, or type of lens elements, while still remaining within the spirit and scope of the invention. It is intended that the scope of the invention be defined by the claims and their equivalents.

In this example, the design range for magnification is to be from 7 to 13 times (nominal 10×). The goal of this example is to define a lens design that can be used with all three colors individually or simultaneously using dichroic mirrors or prisms near the CRT image. The design should allow for minor adjustments or a single element exchange to accommodate differences in magnification versus color. A conventional positive lens, diffractive or Fresnel element can be used nearthe RMP-faceplate surface, as a field lens, to accommodate converging the image into a smaller lens aperture.

Lens System Characteristics

Source "Object". In this example, the lens system is designed for an image-source [Object] of "7 inch" RMP CRT having a 12×16 or 9×16 aspect ratio [V×H]. The CRT faceplate shall be glass, as described below. The visible display image format will have a 5.6" diagonal in the 12:16 format or a 5" diagonal in the 9:16 format.

Target "Image". In this example, the target-image [Image] shall be a rear projection screen with a diagonal of 39" (~991 mm) to 73" (~1852 mm) depending on the magnification needed. The screen can be a simple screen or a micro-optical screen with brightness gain and/or contrast enhancement. The lens design shall be suitable in both cases.

Throw Distance. In this example, the design goal for the throw distance, the distance from the "object" to the "image", shall be as short as practical consistent with the other design parameters. A distance approximately equal to the diagonal of the Target image is the goal.

Focal Length. In this example, the effective lens focal length (including the diffractive element or Fresnel element located nearthe "object") shall be in the range of 50 mm to 200 mm and optimized for the throw distance, image to object size, and other performance parameters given herein.

Focus Adjustment. In this example, the design shall allow for both focus adjustment as well as magnification adjustment of up to 5%. Alternate designs may not require adjustment.

F-number. In this example, the effective F-number of the optical system shall be no greater than F/2.5.

Wavelength. In this example, the design wavelengths are the three Color sets (x,y CIE 1931): Red=624 nm (0.699, 0.301); Blue=455 nm (0.150,0.024); Green=544 nm (0.251, 0.737). The lens design shall work properly at each wavelength with only minor adjustments for each color to provide magnification and/or focus matching.

Figure 4:
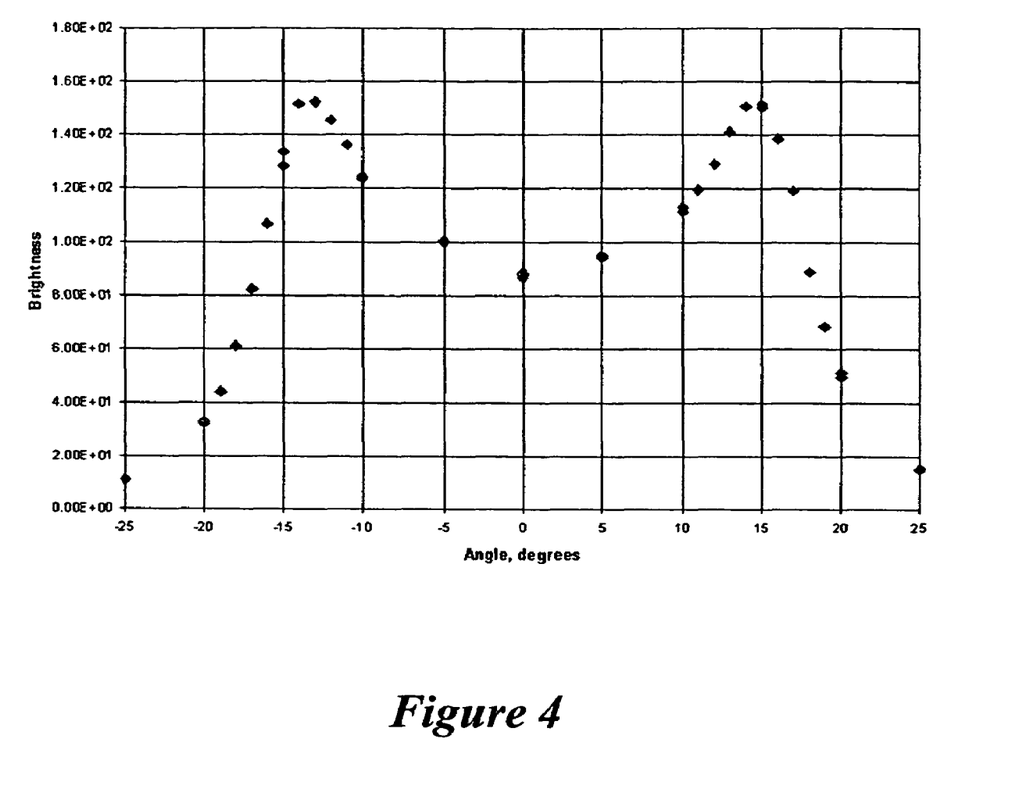
FIG. 4 shows an illustration of how an RMP type of CRT in accordance with an embodiment of the invention, emits light.

Wavelength, Flux and Emission angle. In accordance with one embodiment, the RMP CRT is designed to emit light approximately as shown in FIG. 4. The wavelength content will vary slightly with angle. The emission wavelength will be approximately plus 5 nm at zero angle and minus 5 nm at 15 degrees with the peak per paragraph 2.5 at approximately 12 degrees.

Relative Illumination. In this example, the relative illumination at the image plane shall be as flat as possible with minimum vignetting.

Fluid Coupling. In this example, the lens system design should be such as to allow a cooling fluid between the CRT faceplate and the first optical element of the lens system. The optical index of the fluid will be approximately 1.410 to 1.500. The design should also work without the fluid. Mixed optical quality heat exchange fluids such as glycerin, glycerin and water, ethylene glycol and water, glycerol or other optically compatible heat transfer fluids may be used.

Magnification Range. In this example, the lens design shall accommodate a magnification range from 7× to 13×.

Image Plane Resolution. In this example, the lens shall be designed for minimum degradation of a 7 lp/mm to 10 lp/mm, sine-wave or square-wave "object", projected onto the viewing screen [Target] at 10×. The target sine-wave MTF, at 10 lp/mm, shall be greater than or equal to 50% over the entire image format.

Distortion/Aberration. In this example, the color aberration shall be such that the three color images with three separate lenses can be matched within 0.25 pixels, when displaying superimposed and aligned, 1920×1080 pixel, HDTV images in all three colors.

Faceplate Dimensions

In accordance with one embodiment, the full faceplate dimensions for the RPM CRT will be 111.0±0.5 mm×142.5±0.5 mm×6.5±0.5 mm thick, of Scott glass #S8003 or equal. The face plate refractive index is a nominal 1.54. The useful clear area will be as defined in paragraph 2.1 above.

Example Lens Prescription

The following section provides a prescription for one embodiment of a lens assembly. This example is provided for the purposes of illustration and description. It is not intended to be exhaustive or to limit the invention to the precise forms disclosed. Many modifications and variations will be apparent to one of ordinary skill in the art. The embodiment described below is given in order to best explain the principles of the invention and its practical application, thereby enabling others skilled in the art to understand the invention for various embodiments, and with various modifications that are suited to the particular use contemplated. Particularly, it will be evident that minor modifications may be made to the arrangements, dimensions, and compositional materials of the lens elements, and that one or more lens elements within a functional group may be replaced with a different number, arrangement, or type of lens elements, while still remaining within the spirit and scope of the invention. It is intended that the scope of the invention be defined by the claims and their equivalents.

In accordance with this particular embodiment, the surface data summary shows OBJ as the object surface itself. Surface STO is a stop or diameter through which the light enters. Surface 2 is the phosphor (RPM) surface. Surface 3 is a gap/cavity or a cooling liquid between the phosphor and the field lens. Surface 4 is in this instance a "dummy" surface which has no functional operation. Surface 5 and 6 combined is a glass plano-convex lens of 20 mm thickness (surface 5 is planar, while surface 6 is curved concave to the left according to the nomenclature used). Surface 7 and 8 combined is a plastic (acrylic) lens with two concave surfaces. Surface 9 and 10 combined is a positive glass lens element. Surface 11 and 12 combined is another plastic lens.

Surface 13 and 14 combined is another plastic lens. Surface 15 and 16 combined is the final glass element. Surface IMA is in this example the final image diameter. As can be seen from the surface date summary, the cooling 3 (which may or may not contain a cooling liquid) is planar, as indicated by its radius of infinity, and its placement between the RPM surface 2 (also having a radius of infinity) and the matching surface of the field lens 5 (also having a radius of infinity). The use of a planar gap alleviates any temperature differentials across the cooling liquid and the lens surfaces, as compared with alternate designs that may have a non-planar gap between the face plate and the field lens. This design minimizes or eliminates instances in which a non-planar cooling liquid may heat up non-uniformly and cause an unwanted lensing effect.

SURFACE DATA SUMMARY

| Surf | Type | Comment | Radius (mm) | Thickness (mm) | Glass | Diameter (mm) | Conic |
|---|---|---|---|---|---|---|---|
| OBJ | STANDARD | | Infinity | 90000 | | 152 | 0 |
| STO | STANDARD | | Infinity | −90000 | | 36742.35 | 0 |
| 2 | STANDARD | | Infinity | 6.75 | BAK2 | 152 | 0 |
| 3 | STANDARD | | Infinity | 6.85 | GLYCERIN | 151.9225 | 0 |
| 4 | STANDARD | | Infinity | 0.01 | | 151.8403 | 0 |
| 5 | STANDARD | | Infinity | 20 | SFL6 | 151.8401 | 0 |
| 6 | STANDARD | | −212.03 | 83.15977 | | 151.7826 | 0 |
| 7 | STANDARD | | −78.02243 | 11 | ACRYLIC | 132 | 0 |
| 8 | EVENASPH | | −114.5519 | 34.00286 | | 132 | 0 |
| 9 | STANDARD | | 272.46 | 25 | SFL6 | 132 | 0 |
| 10 | STANDARD | | −154.355 | 1.026653 | | 132 | 0 |
| 11 | EVENASPH | | 115.9128 | 18.6 | ACRYLIC | 114 | 0 |
| 12 | STANDARD | | 229.398 | 2 | | 110 | 0 |
| 13 | STANDARD | | 54.2 | 16 | POLYSTYR | 92 | 0 |
| 14 | EVENASPH | | 60.62909 | 48.44913 | | 78 | 0 |
| 15 | STANDARD | | −35.54 | 7 | SF14 | 66 | 0 |
| 16 | STANDARD | | −70.46 | 1040.155 | | 92 | 0 |
| IMA | STANDARD | | Infinity | | | 2131.691 | 0 |

The surface data detail shows additional information for each of the lens surfaces, including apertures and coefficients for one embodiment. This information may be used to manufacture the required lenses.

SURFACE DATA DETAIL:

| | |
|---|---|
| Surface OBJ | STANDARD |
| Surface STO | STANDARD |
| Surface 2 | STANDARD |
| Surface 3 | STANDARD |
| Surface 4 | STANDARD |
| Surface 5 | STANDARD |
| Surface 6 | STANDARD |
| Surface 7 | STANDARD |
| Aperture | Circular Aperture |
| Minimum Radius | 0 |
| Maximum Radius | 54 |
| Surface 8 | EVENASPH |
| Coeff on r 2 | 0 |
| Coeff on r 4 | 1.4565176e−006 |
| Coeff on r 6 | −2.6037734e−010 |
| Coeff on r 8 | 2.6392989e−013 |
| Coeff on r 10 | −1.2790245e−016 |
| Coeff on r 12 | 2.9743868e−020 |
| Coeff on r 14 | −2.7946196e−024 |
| Coeff on r 16 | 0 |
| Aperture | Circular Aperture |
| Minimum Radius | 0 |
| Maximum Radius | 54 |
| Surface 9 | STANDARD |

-continued
SURFACE DATA DETAIL:

| | |
|---|---|
| Aperture | Circular Aperture |
| Minimum Radius | 0 |
| Maximum Radius | 64 |
| Surface 10 | STANDARD |
| Aperture | Floating Aperture |
| Maximum Radius | 66 |
| Surface 11 | EVENASPH |
| Coeff on r 2 | 0 |
| Coeff on r 4 | 9.3097891e−007 |
| Coeff on r 6 | −7.2241502e−011 |
| Coeff on r 8 | 1.4216241e−014 |
| Coeff on r 10 | 1.0517895e−018 |

-continued
SURFACE DATA DETAIL:

| | |
|---|---|
| Coeff on r 12 | −2.828178e−022 |
| Coeff on r 14 | −1.2958898e−025 |
| Coeff on r 16 | 0 |
| Aperture | Floating Aperture |
| Maximum Radius | 57 |
| Surface 12 | STANDARD |
| Aperture | Floating Aperture |
| Maximum Radius | 55 |
| Surface 13 | STANDARD |
| Aperture | Floating Aperture |
| Maximum Radius | 46 |
| Surface 14 | EVENASPH |
| Coeff on r 2 | 0 |
| Coeff on r 4 | 1.0694482e−006 |
| Coeff on r 6 | 1.6944909e−010 |
| Coeff on r 8 | −3.7530135e−013 |
| Coeff on r 10 | 4.8727623e−016 |
| Coeff on r 12 | −3.2900257e−019 |
| Coeff on r 14 | 4.8166549e−023 |
| Coeff on r 16 | 0 |
| Aperture | Floating Aperture |
| Maximum Radius | 39 |
| Surface 15 | STANDARD |
| Aperture | Floating Aperture |
| Maximum Radius | 33 |
| Surface 16 | STANDARD |
| Aperture | Floating Aperture |
| Maximum Radius | 46 |
| Surface IMA | STANDARD |

-continued

| SURFACE DATA DETAIL: | |
|---|---|
| Aperture | Circular Aperture |
| Minimum Radius | 0 |
| Maximum Radius | 1100 |

Coatings may be applied as needed, including for example, anti-reflective coatings.

Coating Definitions: TBD

The multi-configuration data shows additional modifications which compensate for the use of different wavelengths, for example red, green, and blue.

| MULTI-CONFIGURATION DATA: | |
|---|---|
| Configuration 1: | |
| 1 Wave wgt 1 | 130 |
| 2 Wave wgt 2 | 0 |
| 3 Wave wgt 3 | 0 |
| 4 Curvature 9 | 0.003670264 |
| 5 Curvature 10 | −0.006478572 |
| 6 Curvature 15 | −0.02813731 |
| 7 Curvature 16 | −0.01419245 |
| 8 Glass 15 | SF14 |
| 9 Thickness 8 | 34.00286 |
| 10 Thickness 9 | 25 |
| 11 Thickness 10 | 1.026653 |
| 12 Thickness 14 | 48.44913 |
| 13 Thickness 15 | 7 |
| 14 Thickness 16 | 1040.155 Variable |
| 15 Thickness 6 | 83.15977 Variable |
| Configuration 2: | |
| 1 Wave wgt 1 | 0 |
| 2 Wave wgt 2 | 3 |
| 3 Wave wgt 3 | 0 |
| 4 Curvature 9 | 0.0041248 |
| 5 Curvature 10 | −0.006242353 |
| 6 Curvature 15 | −0.02912565 |
| 7 Curvature 16 | −0.01537184 |
| 8 Glass 15 | SFL6 |
| 9 Thickness 8 | 30 |
| 10 Thickness 9 | 28.3 |
| 11 Thickness 10 | 0.6 |
| 12 Thickness 14 | 46.685 |
| 13 Thickness 15 | 12.7 |
| 14 Thickness 16 | 1040 Variable |
| 15 Thickness 6 | 79.21967 Variable |
| Configuration 3: | |
| 1 Wave wgt 1 | 0 |
| 2 Wave wgt 2 | 0 |
| 3 Wave wgt 3 | 22 |
| 4 Curvature 9 | 0.003670264 |
| 5 Curvature 10 | −0.006478572 |
| 6 Curvature 15 | −0.02848597 |
| 7 Curvature 16 | −0.01356484 |
| 8 Glass 15 | SSKN8 |
| 9 Thickness 8 | 34.00286 |
| 10 Thickness 9 | 25 |
| 11 Thickness 10 | 1.026653 |
| 12 Thickness 14 | 48.78761 |
| 13 Thickness 15 | 4.3 |
| 14 Thickness 16 | 1043.943 Variable |
| 15 Thickness 6 | 78.15732 Variable |

The foregoing description of preferred embodiments of the present invention been provided for the purposes of illustration and description. It is not intended to be exustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. Particularly, it will be evident that minor modifications may be made to the arrangements, dimensions, and compositional materials of the lens elements, and that one or more lens elements within a functional group may be replaced with a different number, arrangement, or type of lens elements, while still remaining within the spirit and scope of the invention. It is intended that the scope of the invention be defined by the following claims and their equivalents.

What is claimed is:

1. A system for projecting an image onto a screen or display, comprising:
    a cathode ray tube including a resonant microcavity phosphor and a faceplate, and capable of producing telecentric light for an image; and
    a lens assembly, the lens assembly comprising in sequence:
        a plano-convex field lens element positioned close to or coupled with the faceplate,
        a negatively-powered aspheric lens element, and
        a set of positively powered lens elements positioned further from the faceplate.

2. The system of claim 1 wherein the lens assembly further comprises an additional negatively-powered lens element adapted to locate the final image on the screen.

3. The system of claim 1, wherein the field lens includes a planar surface coupled to said faceplate.

4. The system of claim 1, wherein the lens assembly includes a planar gap between the faceplate and the field lens.

5. The system of claim 1 further comprising:
    multiple cathode ray tubes, wherein each cathode ray tube is capable of projecting telecentric light for an image; and
    a separate lens assembly for each of said multiple cathode ray tubes.

6. A system for projecting an image onto a screen or display, comprising:
    a cathode ray tube including a resonant microcavity phosphor and a faceplate, said cathode ray tube capable of producing telecentric light for an image; and
    a lens assembly, the lens assembly comprising in sequence:
        a plano-convex field lens positioned close to or coupled with the faceplate, said field lens having a planar surface and optically coupled to said faceplate,
        a negatively powered aspherical lens element,
        a set of positively powered lens elements, and
        a negatively-powered meniscus lens element adapted to locate the final image on the screen.

7. A system for projecting an image, comprising:
    a cathode ray tube including a resonant microcavity phosphor and having a faceplate, said cathode ray tube being capable of projecting telecentric light for an image;
    a telecentric lens assembly including a field lens, and wherein said telecentric lens assembly is adapted to receive an image from said cathode ray tube;
    wherein the field lens is plano-convex and includes a planar surface optically coupled to the faceplate; and
    wherein the lens assembly includes a planar gap or cavity between the faceplate and the field lens.

8. The system according to claim 7, wherein the lens assembly includes a focusing group including additional optical elements for transmitting and focusing the image from the field lens onto the projection surface.

9. The system according to claim 8, wherein the focusing group includes a selection of lens including any of a spherical lens adapted to redirect telecentric light for a projected image, a negatively-powered aspheric lens element adapted to correct residual curvature of light passing through the spherical lens, a set of positively powered lens elements adapted to adjust the size of the projected image, and/or a negatively-powered meniscus lens element adapted to locate the light received from the set of positively powered lens elements at a desired throw distance.

10. The system of claim 7 further comprising:
multiple cathode ray tubes, wherein each cathode ray tube is capable of projecting telecentric light for an image; and,
a telecentric lens system for each of said multiple cathode ray tubes.

11. A system for projecting an image, comprising:
a plurality of cathode ray tubes, wherein each of said plurality of cathode ray tubes includes a resonant microcavity phosphor and a faceplate, and wherein each of said cathode ray tubes is capable of projecting telecentric light for an image;
a plurality of telecentric lens assemblies optically coupled respectively to each of said plurality of cathode ray tubes, wherein each telecentric lens assembly is adapted to receive an image from its respective cathode ray tube, and wherein each of said telecentric lens assembly comprises in sequence a plano-convex field lens element positioned close to or coupled with the faceplate, a negatively-powered aspheric lens element, and a set of positively powered lens elements positioned further from the faceplate.

12. A lens assembly for use in projecting a telecentric image, comprising:
a telecentric lens assembly adapted to receive an image from an image source, and that allows an image of said image source to be projected onto a projection surface, wherein said telecentric lens assembly comprises in sequence a plano-convex field lens having a planar surface and coupled to said image source, an aspheric lens element, and a set of positively powered lens elements positioned further from the image source.

13. The lens assembly according to claim 12, wherein the image source is a cathode ray tube faceplate.

14. The lens assembly according to claim 13, wherein the cathode ray tube is a resonant microcavity phospor device.

15. The lens assembly according to claim 12, wherein the lens assembly includes a planar gap or cavity between the faceplate and the field lens.

16. The system of claim 4 wherein the planar gap between the faceplate and the field lens includes a cooling fluid.

17. The system of claim 7 wherein the planar gap between the faceplate and the field lens includes a cooling fluid.

18. The lens assembly of claim 15 wherein the planar gap between the faceplate and the field lens includes a cooling fluid.

19. A system for projecting an image onto a screen or display, comprising:
an image source having a faceplate and capable of producing light for an image;
a telecentric lens assembly adapted to receive and project an image from said image source;
wherein the lens assembly comprises in sequential order
a plano-convex field lens having a planar surface and optically coupled to the faceplate, wherein the lens assembly includes a planar cavity between the faceplate and the field lens;
a spherical lens element,
an aspheric lens element,
a set of positively powered lens elements; and
a negatively-powered meniscus lens element adapted to locate the final image on the screen or display.

20. The system of claim 19, wherein the image source is a cathode ray tube having a faceplate.

21. The system of claim 20, wherein the cathode ray tube is a resonant microcavity phospor device.

22. The system of claim 20 further comprising:
multiple cathode ray tubes, wherein each cathode ray tube is capable of projecting telecentric light of a different color for an image; and
a separate lens assembly for each of said multiple cathode ray tubes.

* * * * *